(12) United States Patent
Suzuki

(10) Patent No.: US 9,063,686 B2
(45) Date of Patent: Jun. 23, 2015

(54) DISTRIBUTING SETTING VALUES FROM A CLIENT DEVICE TO AN IMAGE FORMING APPARATUS

(71) Applicant: CANON KABUSHIKI KAISHA, Tokyo (JP)

(72) Inventor: Ruri Suzuki, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/870,881

(22) Filed: Apr. 25, 2013

(65) Prior Publication Data

US 2013/0321834 A1    Dec. 5, 2013

(30) Foreign Application Priority Data

May 30, 2012  (JP) ................. 2012-122908

(51) Int. Cl.
*G06F 3/12* (2006.01)
*H04L 29/08* (2006.01)
*H04N 1/00* (2006.01)
*H04N 1/32* (2006.01)

(52) U.S. Cl.
CPC ............ *G06F 3/1293* (2013.01); *G06F 3/1204* (2013.01); *G06F 3/1231* (2013.01); *G06F 3/1285* (2013.01); *H04L 67/12* (2013.01); *H04N 2201/3276* (2013.01); *H04N 2201/3204* (2013.01); *H04N 1/00344* (2013.01); *H04N 1/32106* (2013.01); *H04N 1/32502* (2013.01); *H04N 2201/0094* (2013.01); *H04N 2201/3278* (2013.01); *H04N 2201/3205* (2013.01); *H04N 2201/3208* (2013.01)

(58) Field of Classification Search
CPC .... G06F 3/1293; G06F 3/1204; G06F 3/1231
USPC ........................................................ 358/1.15
See application file for complete search history.

(56) References Cited

U.S. PATENT DOCUMENTS

2005/0021728 A1*  1/2005  Sugimoto ..................... 709/223

FOREIGN PATENT DOCUMENTS

JP         2011-053985 A      3/2011

* cited by examiner

*Primary Examiner* — Eric A Rust
(74) *Attorney, Agent, or Firm* — Canon USA, Inc., IP Division

(57) ABSTRACT

A distribution system includes an image processing apparatus to connect to a distribution apparatus over a network. The image processing apparatus includes first and second reception units, an analysis unit, a reflection unit, and first and second notification units. The analysis unit analyzes a received setting value used to connect to the distribution apparatus. The second reception unit receives an inquiry to acquire an import processing status using the import data. The reflection unit performs the import processing. The notification units notify the distribution apparatus about the analyzed setting value and the status of the import processing. The distribution apparatus includes an inquiry unit, first and second reception units, and a control unit. The control unit controls, in response to the distribution apparatus not being able to connect to the image processing apparatus, the inquiry unit to issue the inquiry using the setting value received by the first reception unit.

20 Claims, 16 Drawing Sheets

Select Device Config Type to Distribute

Select Device Config Type to Distribute

- ● Select to edited information list
- ○ Select to buckup list

*501*

[Back] [Next] [Cancel]
*503* *504*

Select Device Config Type to Distribute

Edited Information List

| Edited Information Name | Updated On |
|---|---|
| ○ SettingData-1 | 2011/2/16 12:20:34 |
| ○ SettingData-2 | 2011/5/1 12:20:34 |
| ○ SettingData-3 | 2011/9/22 12:20:34 |

*511*

[Back] [Next] [Cancel]
*512* *513* *514*

Select Device Config Type to Distribute

Managed Device List

| Device Name |
|---|
| ○ Device-1 |
| ○ Device-2 |
| ○ Device-3 |

*521* the Date to Distribute

| Date | Time |
|---|---|
| 2012/4/17 | 0:00:00 |

*522*

*523* *524* *525*

[Back] [Register] [Cancel]

FIG.6A

|   | SETTING BEFORE DISTRIBUTION | NETWORK SETTING OF IMPORT DATA | |
|---|---|---|---|
| 1 | 192.168.0.1 | 192.168.0.1 | ~601 |
| 2 | 192.168.0.1 | 192.168.0.2 | ~602 |

FIG.6B

|   | SETTING BEFORE DISTRIBUTION | NETWORK SETTING OF IMPORT DATA | |
|---|---|---|---|
| 1 | 2001:0db8:1234:5678:90ab:cdef:0000:0000 | 2001:0db8:1234:5678:90ab:cdef:0000:0000 | ~611 |
| 2 | 2001:0db8:1234:5678:90ab:cdef:0000:0000 | 2001:0db8:1234:5678:90ab:cdef:9999:9999 | ~612 |

FIG.6C

|   | SETTING BEFORE DISTRIBUTION IPv4/IPv6 | | NETWORK SETTING OF IMPORT DATA IPv4/IPv6 | | |
|---|---|---|---|---|---|
| 1 | 192.168.0.1 | 2001:0db8:1234:5678:90ab:cdef:0000:0000 | 192.168.0.1 | 2001:0db8:1234:5678:90ab:cdef:0000:0000 | ~621 |
| 2 | 192.168.0.1 | 2001:0db8:1234:5678:90ab:cdef:0000:0000 | 192.168.0.1 | 2001:0db8:1234:5678:90ab:cdef:9999:9999 | ~622 |
| 3 | 192.168.0.1 | 2001:0db8:1234:5678:90ab:cdef:0000:0000 | 192.168.0.2 | 2001:0db8:1234:5678:90ab:cdef:0000:0000 | ~623 |
| 4 | 192.168.0.1 | 2001:0db8:1234:5678:90ab:cdef:0000:0000 | 192.168.0.2 | 2001:0db8:1234:5678:90ab:cdef:9999:9999 | ~624 |

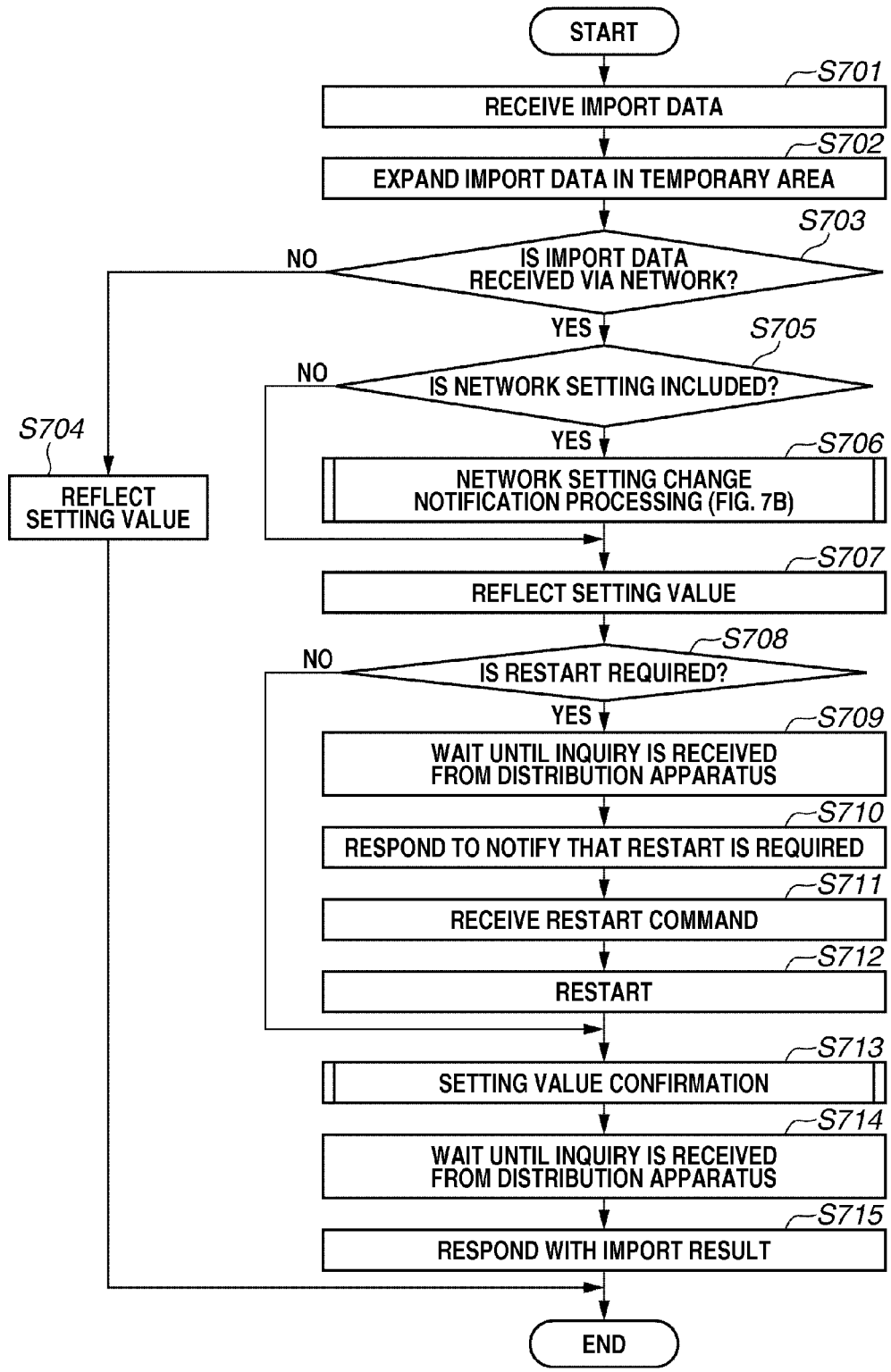

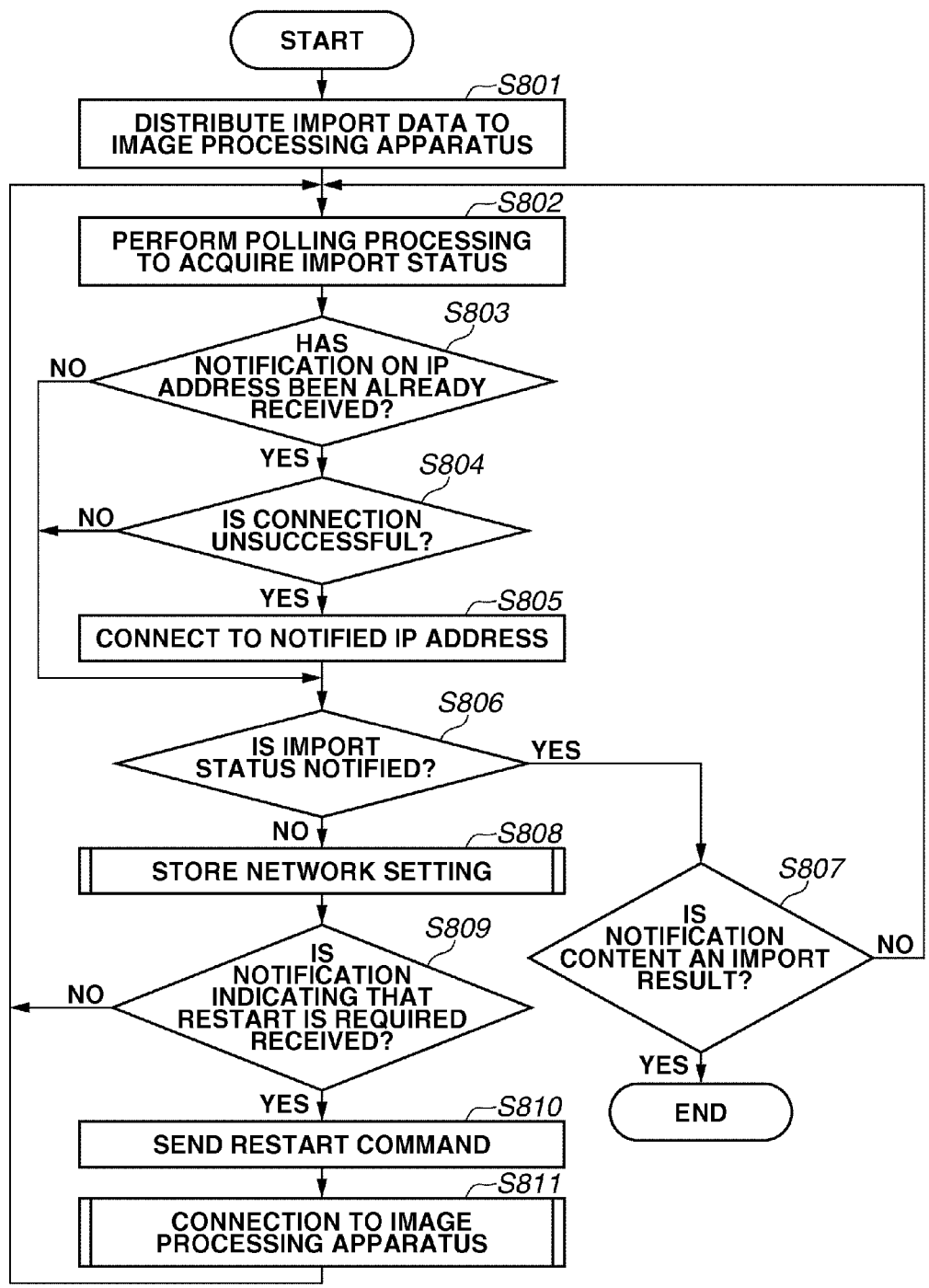

FIG.9

| | SETTING BEFORE DISTRIBUTION | SETTING AFTER DISTRIBUTION | |
|---|---|---|---|
| 1 | DHCP: On | DHCP: On | ~901 |
| 2 | DHCP: Off | DHCP: On | ~902 |
| 3 | DHCP: On | DHCP: Off | ~903 |

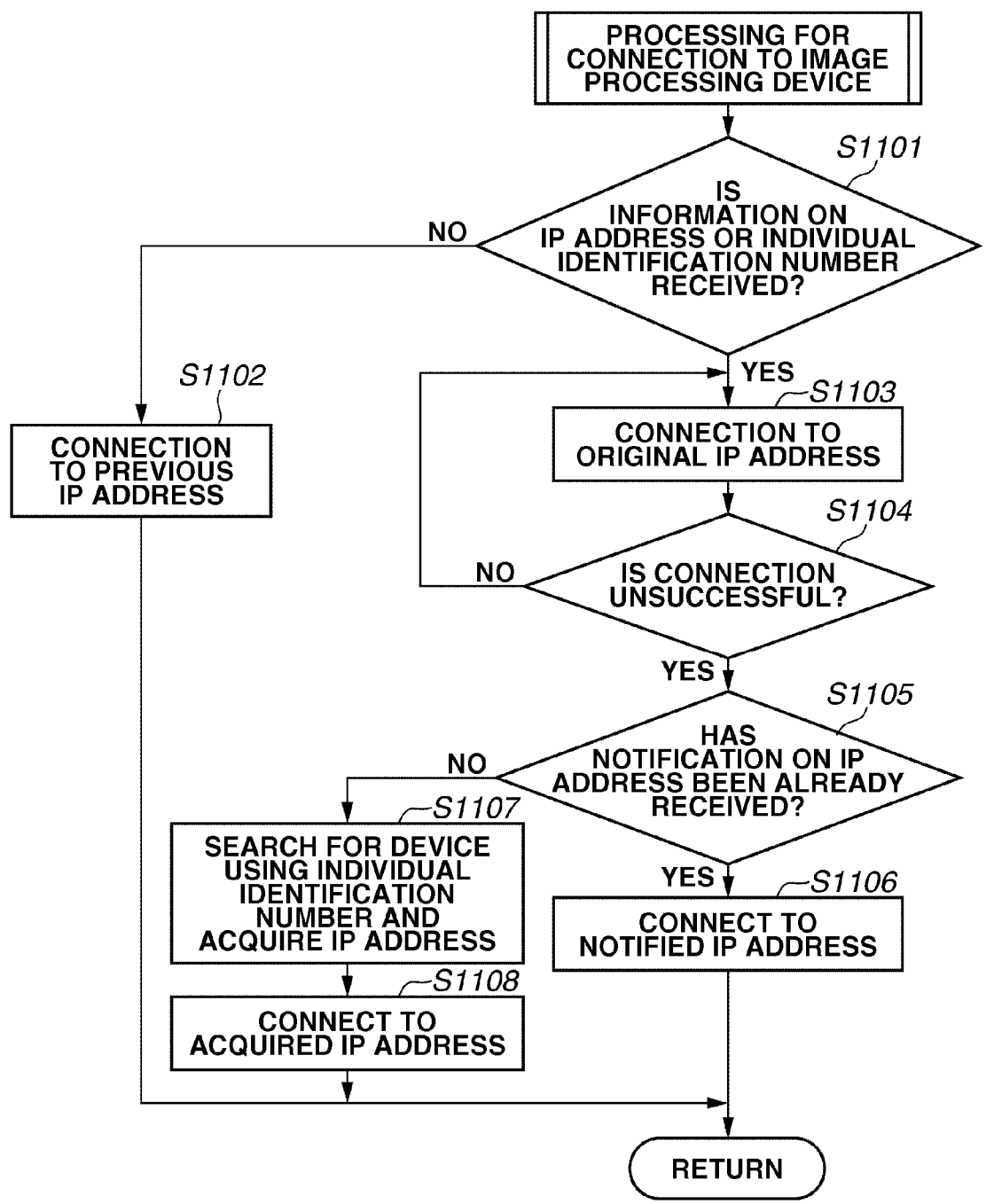

DISTRIBUTING SETTING VALUES FROM A CLIENT DEVICE TO AN IMAGE FORMING APPARATUS

BACKGROUND OF THE INVENTION

1. Field of the Invention

The present invention relates to a technique for distributing a setting value from a distribution apparatus to an image processing apparatus via a network.

2. Description of the Related Art

A tendency for recent image processing apparatuses is that an increase in multifunctionalization increases the number of setting items and an increase in function complexity requires more expertise. In particular, incorrect settings for a network function can lead to operation problems or security problems. This means that, when a plurality of image processing apparatuses is introduced, an administrator with specialized knowledge is required to set almost the same settings for each of the image processing apparatuses. The problem here is that the load of the administrator is increased.

To solve this problem, the service referred to as a device information distribution function is available. This distribution function acquires device information from an image processing apparatus and sends the acquired device information to other image processing apparatuses for setting the device information thereon. This function allows device information, which is set for the image processing apparatus, to be reflected on other image processing apparatuses without the administrator having to manually set device information for the image processing apparatuses, one at a time.

Japanese Patent Application Laid-Open No. 2011-053985 discusses a technique for reducing the administrator's workload by managing setting information via a distribution server and distributing (and setting) created setting values to image processing apparatuses.

As described in the BACKGROUND OF THE INVENTION, distributing settings via a network for reflecting those settings on the image processing apparatuses allows the setting values to be reflected without having to visit each site where an image processing apparatus is installed.

However, a network setting value, when the setting values of the network settings among the setting values are distributed to image processing apparatuses in a networked environment, results in a change in the network setting of the image processing apparatus. If the distribution apparatus does not accurately know the distribution content when distributing setting values to image processing apparatuses to establish synchronization with the setting values acquired from another image processing apparatus, the distribution apparatus sometimes cannot detect a network setting that is changed by the distribution of the setting values. In such a case, the problem is that the distribution apparatus cannot connect to an image processing apparatus operating under the newly-set network setting. Therefore, the image processing apparatus, which cannot connect to the distribution apparatus, cannot acquire the setting status of the setting values distributed by the distribution apparatus, and the reflection result. In addition, the administrator cannot confirm whether the reflection of distributed setting values is successfully completed or erroneously terminated.

SUMMARY OF THE INVENTION

The present invention is directed to a mechanism that prevents disconnection via a network between a distribution apparatus and an image processing apparatus even if network setting values are included in the setting values to be distributed from the distribution apparatus to the image processing apparatus.

According to an aspect of the present invention, a distribution system includes an image processing apparatus configured to be connected to a distribution apparatus over a network and having: a first reception unit configured to receive import data from the distribution apparatus, an analysis unit configured to analyze, from the received import data, a setting value used to connect to the distribution apparatus over the network, a second reception unit configured to receive, from the distribution apparatus, an inquiry to acquire a status of import processing using the received import data, a reflection unit configured to perform the import processing by using the received import data and reflect a setting value included in the received import data, a first notification unit configured to notify, as a response to the received inquiry, the distribution apparatus about the setting value analyzed by the analysis unit, and a second notification unit configured to notify, as a response to the received inquiry, the distribution apparatus about the status of the import processing, and the distribution apparatus, wherein the distribution apparatus includes: an inquiry unit configured to send an inquiry to acquire a status of import processing using the import data, after the import data is distributed to the image processing apparatus, a first reception unit configured to receive, from the image processing apparatus and as a response to the inquiry, a setting value analyzed by the analysis unit, a second reception unit configured to receive, from the image processing apparatus and as a response to the inquiry, a status of the import processing, and a control unit configured to control, in response to the distribution apparatus not being able to connect to the image processing apparatus, the inquiry unit to issue the inquiry using the setting value received by the first reception unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A, 5B, and 5C are diagrams illustrating examples of screens for registering an import task on the distribution apparatus.

FIGS. 6A, 6B, and 6C are diagrams illustrating examples of Internet Protocol (IP) addresses before and after setting distribution.

FIGS. 7A and 7B are flowcharts illustrating import processing performed by the image processing apparatus.

FIGS. 8A, 8B, and 8C are flowcharts illustrating processing related to an import task performed by the distribution apparatus.

FIG. 9 is a table illustrating an example of Dynamic Host Configuration Protocol (DHCP) setting before and after setting distribution according to a second exemplary embodiment.

FIGS. 11A and 11B are flowcharts illustrating processing performed by the distribution apparatus considering a DHCP setting according to the second exemplary embodiment.

DESCRIPTION OF THE EMBODIMENTS

Various exemplary embodiments, features, and aspects of the invention will be described in detail below with reference to the drawings.
<Definition of Terms>
First, the following defines the terms used in the description of the exemplary embodiments of the present invention.

"Export" refers to processing performed by an image processing apparatus to output a setting value, which is managed by the image processing apparatus, to an external device. "Export data" refers to a setting value exported from an image processing apparatus. More specifically, "export data" includes the information about an address book, information about an administrator, and network setting values. "Import" refers to processing performed by an image processing apparatus to acquire a setting value from an external device and reflect the acquired setting value on the image processing apparatus. "Import data" refers to a setting value received by an image processing apparatus for importing.

For example, the synchronization of a specific setting value among a plurality of image processing apparatuses can be easily accomplished by importing to other image processing apparatuses export data exported from an image processing apparatus.

An "individual identification number" is a type of identification information that can identify an image processing apparatus. An individual identification number is a unique number.

A "task" refers to a unit of processing performed by a distribution apparatus. A user registers a task with an execution timing (time), a processing target apparatus, and processing content (export, import) being specified. The distribution apparatus can manage a plurality of registered tasks. When an execution time specified for a registered task arrives, the distribution apparatus can automatically perform the task and instruct a target apparatus to perform processing. For example, an "export" task indicates a sequence of processing in which the distribution apparatus issues a setting value export instruction to an image processing apparatus and, at the same time, acquires export data. Similarly, an "import" task indicates a sequence of processing in which the distribution apparatus distributes a setting value to image processing apparatuses and, at the same time, instructs the image processing apparatuses to perform import processing.

Figure 1:
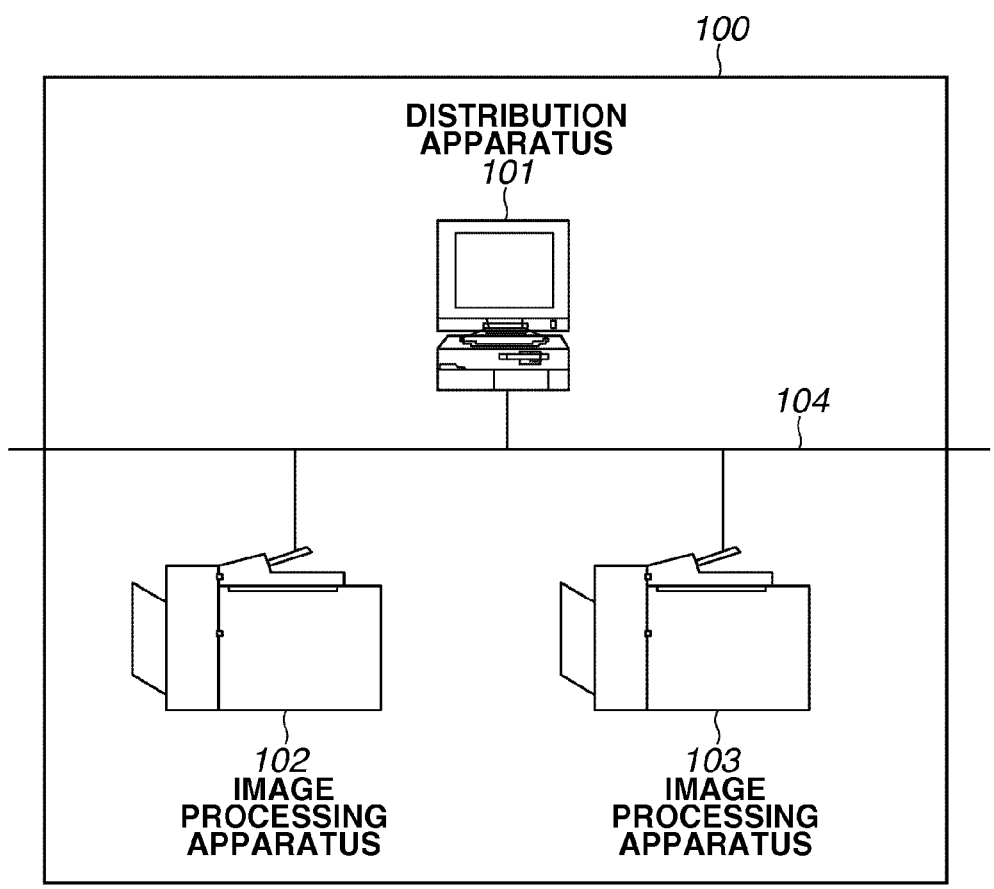
FIG. 1 is a diagram illustrating a general configuration of a distribution system according to an exemplary embodiment of the present invention.

FIG. 1 is a diagram illustrating an example of a distribution system 100 to which the present invention is applicable.

A distribution apparatus 101 performs import processing for target image processing apparatuses 102 and 103 using a registered setting value according to an instruction of an "import" task registered in the distribution apparatus 101. Similarly, the distribution apparatus 101 performs export processing of a setting value requested by a target image processing apparatus 102 or 103 according to a registered "export" task.

The image processing apparatuses 102 and 103, each of which is a multifunction peripheral having the print function and the scan function, import or export a setting value in response to an instruction from the distribution apparatus 101. The present invention is applicable also when the image processing apparatus is a general network-connectable device such as a printer and a scanner. A local area network (LAN) 104 is an example of a network over which the distribution apparatus 101 and a plurality of image processing apparatuses 102 and 103 are connected. In the exemplary embodiments, the connection mode may be an Internet connection.

Figure 2:
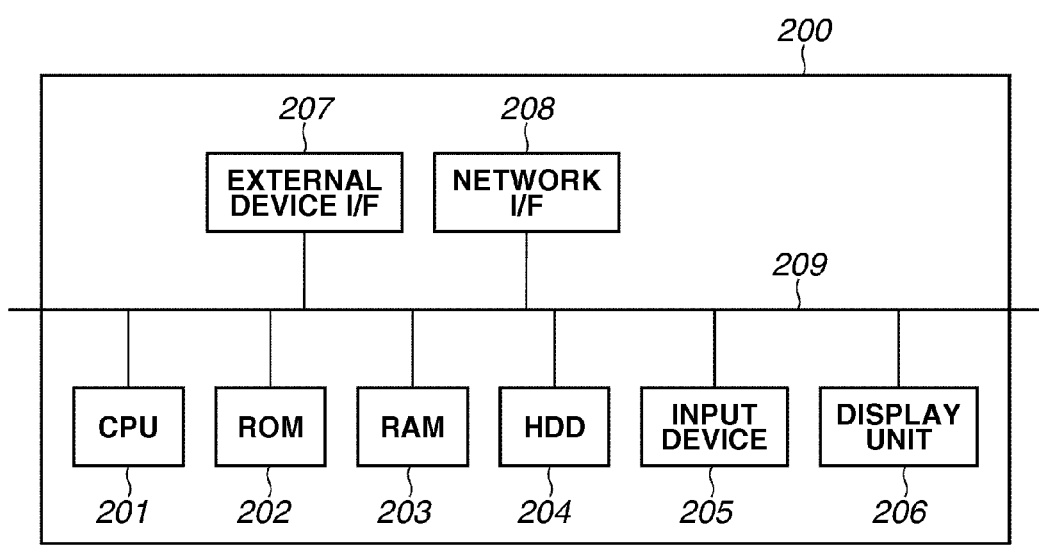
FIG. 2 is a diagram illustrating an example of a hardware configuration of a distribution apparatus according to an exemplary embodiment of the present invention.
Figure 3:
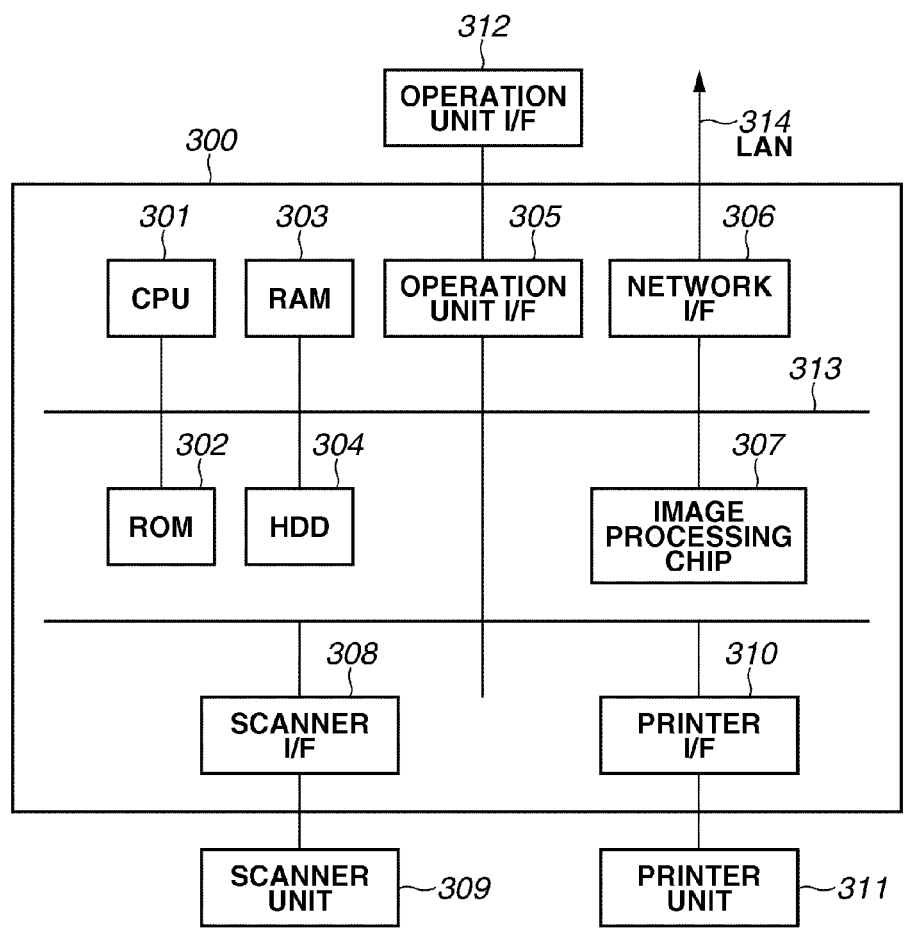
FIG. 3 is a diagram illustrating an example of a hardware configuration of an image processing apparatus according to an exemplary embodiment of the present invention.

Next, referring to FIGS. 2 and 3, a hardware configuration of a distribution apparatus and an image processing apparatus used in this system will be described.

An example of a hardware configuration of the distribution apparatus 101 is described with reference to FIG. 2.

The distribution apparatus 101 includes a control unit 200 that includes a central processing unit (CPU) 201. The distribution apparatus 101 is integrally controlled by the control unit 200. The CPU 201 reads the control program from a read only memory (ROM) 202 for performing various types of control processing. A random access memory (RAM) 203 is used as the main memory of the CPU 201 and a temporary area such as a work area. A hard disk drive (HDD) 204 stores image data, various programs, or various information tables. An input device 205, such as a keyboard or a mouse, is a device for accepting a user-selection instruction and transmits the selected instruction to a program via an internal bus 209. A display unit 206 is a device for providing information to the user. An external device interface (I/F) 207 is an interface via which an external storage device connects to the distribution apparatus 101. A network I/F 208 is a control unit that connects the control unit 200 to a network, such as the LAN 104, to send and receive various types of information to and from the image processing apparatuses 102 and 103. The internal bus 209 is a communication bus for connecting the CPU 201, ROM 202, RAM 203, HDD 204, input device 205, display unit 206, external device I/F 207, and network I/F 208.

When the distribution apparatus 101 is powered on in the configuration described above, the CPU 201 initializes the device according to the boot program stored in the ROM 202, loads the operating system (OS) from the HDD 204 and, then, starts various applications.

Next, an example of a hardware configuration of the image processing apparatuses 102 and 103 is described with reference to FIG. 3.

The image processing apparatus includes a control unit 300 that includes a CPU 301. The image processing apparatus 102 is integrally controlled by the control unit 300. The CPU 301 reads the control program from a ROM 302 for performing various types of control processing. The ROM 302 stores the boot program for the apparatus. A RAM 303 is a system work memory in which the CPU 301 operates and is a memory in which image data is temporarily stored. The RAM 303 is configured by a static random access memory (SRAM), in which data is retained even after power is turned off, and a dynamic random access memory (DRAM) from which stored content is erased after power is turned off. A HDD 304, a hard disk drive, stores image data, various programs, or various information tables. An operation unit I/F 305 is an interface unit for connecting a system bus 313 and an operation unit 312. The operation unit I/F 305 outputs image data prepared for display on the operation unit 312 to the system bus 313 and, at the same time, outputs information received from the operation unit 312 to the system bus 313. The operation unit 312 has a display unit (e.g., a liquid crystal display unit having the touch panel function) and a keyboard. A network I/F 306 connects the image processing apparatus to a network such as a LAN 314, and to the system bus 313 for receiving and sending information.

A scanner I/F 308 corrects, processes, and edits image data received from a scanner unit 309. The scanner I/F 308 determines whether the received image data is a color document or a black-and-white document and whether the image data is a text document or a picture document. The scanner I/F 308 adds the determination result to the image data. Such added information is referred to as attribute data. A printer I/F 310 receives image data sent from an image processing chip 307 and, while referring to the attribute data added to this image data, forms an image of image data. The image data that is formed is transferred from the control unit 300 to a printer 311 via the printer I/F 310 for printing on a recording medium on the printer 311.

When the image processing apparatus 102 in the above configuration is powered on, the CPU 301 initializes the apparatus according to the boot program stored in the ROM 302, loads the OS from the HDD 304 and, then, starts the operation of various applications.

<Description of Software Function Configuration Diagram of Distribution System>

Figure 4:
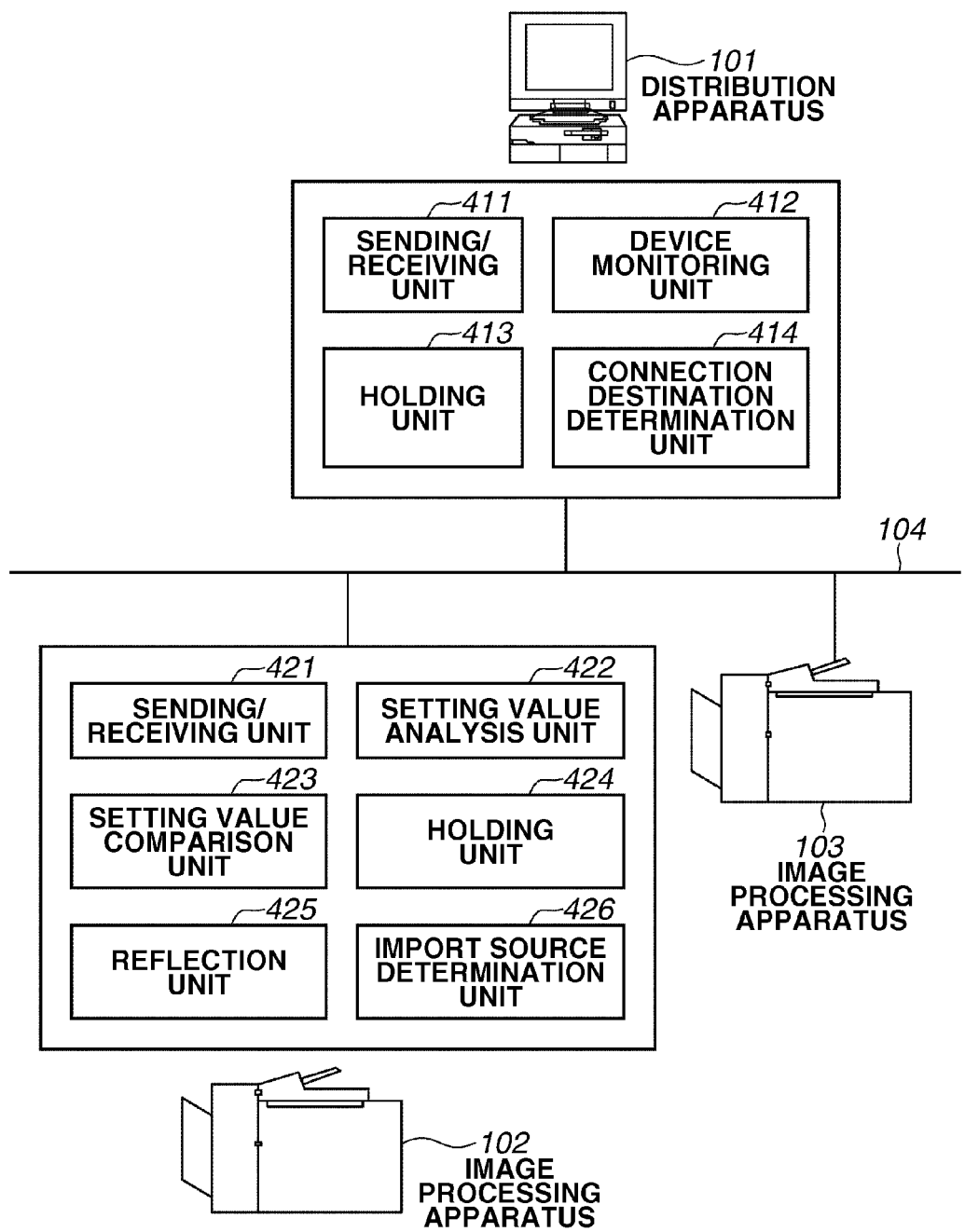
FIG. 4 is a diagram illustrating an example of a function module configuration of the devices according to an exemplary embodiment of the present invention.

FIG. 4 is a diagram illustrating an example of a software function configuration of the system in the present exemplary embodiment.

In the distribution apparatus 101, the software functions (function modules) illustrated in FIG. 4 are implemented by the CPU 201 executing the control program saved in the ROM 202 or the HDD 204. In the image processing apparatus 102, the software functions (function modules) are implemented by the CPU 301 executing the control program saved in the ROM 302 or the HDD 304. In each of those apparatuses, various types of information used at processing execution time are held in the RAM or HDD for exchanging among the function modules.

First, an example of a function module configuration of the distribution apparatus 101 of the present exemplary embodiment is described.

A sending/receiving unit 411 sends a setting value to the image processing apparatus 102, and receives a setting value from the image processing apparatus 102, via the network I/F 208. A device monitoring unit 412 performs polling for the image processing apparatus 102, to which a setting value is distributed, to confirm the import status of the setting value. A holding unit 413 holds information received in response to a polling in a predetermined area of a storage device such as the HDD 204. A connection destination determination unit 414 refers to the information held by the holding unit 413 and performs reconnection processing using a network setting when a connection error occurs between the distribution apparatus 101 and the image processing apparatus 102 on the network.

Next, an example of a function module configuration of the image processing apparatus 102 of the present exemplary embodiment is described. The description of the image processing apparatus 103, as a modular configuration thereof is similar to that of the image processing apparatus 102, is omitted.

A sending/receiving unit 421 performs control of the sending and receiving processing of the image processing apparatus 102 via the network I/F 306. For example, the sending/receiving unit 421 receives a setting value distributed from the distribution apparatus 101. The received setting value is temporarily expanded in the RAM 303. In addition, in response to the polling processing regularly performed by the distribution apparatus 101 to confirm the import status, the sending/receiving unit 421 notifies the distribution apparatus 101 about the import status of a setting value and other necessary information.

A setting value analysis unit 422 analyzes import data expanded in the temporary area. For example, the setting value analysis unit 422 determines whether a network setting is included in the import data and whether an Internet Protocol (IP) address is included in the import data.

A setting value comparison unit 423 checks the network setting. More specifically, the setting value comparison unit 423 determines whether the present network setting value stored in the image processing apparatus differs from the setting value of the import data. If the setting values differ, the sending/receiving unit 421 notifies the distribution apparatus 101, not about the import status, but about the network setting value of the import data, in response to a polling issued by the distribution apparatus 101 to confirm the import status. If the setting values differ, the present exemplary embodiment the sending/receiving unit 421 may notify the distribution apparatus 101 about the import status, as well as about the setting value of the network setting of the import data, in response to the polling from the distribution apparatus 101.

A holding unit 424 temporarily holds a setting value, which must be notified to the distribution apparatus 101, in a storage device such as an HDD 204. For example, if the setting value comparison unit 423 determines that the present IP address and an IP address of import data differ, the holding unit 424 temporarily holds the IP address of the import data. A reflection unit 425 reflects import data on the image processing apparatus 102. More specifically, the reflection unit 425 reflects the import data, which is temporarily expanded in the RAM 303, on the image processing apparatus 102. An import source determination unit 426 determines whether the import data is distributed via the network I/F 208 or distributed using the universal serial bus (USB) via the external device I/F 207.

<Setting-value Distribution Task Registration>

Next, referring to FIGS. 5A to 5C, examples of screens used by the distribution apparatus 101 to distribute a setting value to the image processing apparatuses 102 and 103, will be described. Task registration screens 500, 510, and 520 for registering tasks are displayed on the display unit 206. A setting selected by the input device 205, such as the keyboard or mouse, is reflected on the image processing apparatuses 102 and 103.

FIG. 5A is a diagram illustrating the selection screen 500 used to select a type of a setting value to be distributed using an import task.

On the selection screen 500, the user such as a system administrator can select, via a selection field 501, which setting value to distribute, either a setting value edited by the user or a setting value retrieved from the image processing apparatus. After the selection, the user presses a Next button 503 to shift to the screen in FIG. 5B. When the user presses a Cancel button 504, the task registration is suspended.

FIG. 5B is a diagram illustrating the selection screen 510 that displays a list of files each including setting values held in the distribution apparatus 101 and corresponding to the type selected via the selection screen 500. The selection screen 510 prompts the user to select a setting value to be distributed as import data. Although it is assumed in this example that a plurality of files including a plurality of setting values corresponding to a user-selected type is displayed for selection, it is also possible to allow the user to select setting values, one at a time. The selection and distribution of a plurality of setting values may also be implemented by a format other than a file format.

The selection screen 510 illustrates the screen when the user selects, via the selection screen 500, "edited information list" as the type of setting values to be distributed. On the selection screen 510, a list of files corresponding to "edited information list" held and managed by the distribution apparatus 101, together with the setting-value update time, is displayed. The user can select a file to be distributed to the image processing apparatus via a selection field 511. When the user presses a Next button 513 after the selection, the screen shifts to the screen illustrated in FIG. 5C. When the user presses a Back button 512, the screen returns to the screen illustrated in FIG. 5A. When the user presses a Cancel button 514, the task registration is suspended.

FIG. 5C is a diagram illustrating a setting screen 520 on which the user specifies when to distribute the file, which is selected via the selection screen 510 and which includes a plurality of setting values, to which image processing apparatus managed by the distribution apparatus 101.

On the setting screen 520, a list of image processing apparatuses managed by the distribution apparatus 101 is displayed to allow the user to select, via a selection field 521, one of devices to which the setting value is to be distributed. The user may select two or more image processing apparatuses for distribution. In addition, the user can set, via a setting field 522, date/time information as the time at which the setting value is to be distributed. Although not illustrated, the distribution time may be specified not only as date/time information but also as information indicating how many hours later the setting value will be distributed or information indicating immediate distribution. When the user presses a Register button 524 after the selection, the task registration processing is completed. When the user presses a Back button 523, the screen returns to the screen illustrated in FIG. 5B. When the user presses a Cancel button 525, the task registration is suspended.

<Example of Network Setting Change Notification Processing>

An example of specific setting values of an import task from the distribution apparatus 101 to the image processing apparatus 102, will be described. The example illustrates an example in which an IP address is included as the setting value in a file distributed to the image processing apparatus.

If an IP address setting change is included in the import data when the distribution apparatus 101 distributes import data to the image processing apparatus 102 via a network, there is a possibility that the communication between the distribution apparatus 101 and the image processing apparatus 102 will be disconnected thereafter.

The processing in which, during the import processing performed by the image processing apparatus 102, the image processing apparatus 102 detects an IP address setting change before the setting is changed and notifies the distribution apparatus 101 about the change, will be described in detail.

FIGS. 6A, 6B, and 6C illustrate examples of the setting values reflected on the image processing apparatus 102 depending on whether an IP address value is set, which is one of the network setting values, during the import processing performed by the image processing apparatus 102.

FIG. 6A is a diagram illustrating the import processing including the setting value of an IP address of Internet Protocol version 4 (IPv4).

In the example in a row 601, the present IP address of the image processing apparatus 102 is "192.168.0.1" and the IP address of the import data is also "192.168.0.1". Therefore, the setting value comparison unit 423 determines that the setting values of the IP address before and after the import data is reflected are equal. If the setting value of the IP address is not changed by the import processing, the image processing apparatus 102 reflects the distributed import data without notifying the distribution apparatus 101.

In an example in a row 602, the present IP address of the image processing apparatus 102 is "192.168.0.1" and the IP address of the import data is "192.168.0.2". Therefore, the setting value comparison unit 423 determines that a difference is generated in the setting values of the IP address before and after the import data is reflected. If a difference in the network setting is generated by the import processing, the holding unit 424 holds "192.168.0.2", which is the IP address of the import data, in a predetermined storage area. After that, during the import processing performed by the image processing apparatus 102, the sending/receiving unit 421 retrieves the held IP address in response to the polling performed by the distribution apparatus 101 to confirm the import status, and notifies the distribution apparatus 101 about the retrieved IP address.

FIG. 6B is a diagram illustrating the import processing including the setting value of an IP address of IPv6.

In an example in a row 611, the present IP address of the image processing apparatus 102 and the IP address of the import data are both "2001:0 db8:1234:5678:90ab:cdef: 0000:0000". Therefore, the setting value comparison unit 423 determines that the setting values of the IP address before and after the import data is reflected are equal. If the setting value of the IP address is not changed by the import processing, the image processing apparatus 102 reflects the distributed import data without notifying the distribution apparatus 101.

In an example in a row 612, the present IP address of the image processing apparatus 102 is "2001:0 db8:1234:5678: 90ab:cdef:0000:0000" and the IP address of the import data is "2001:0 db8:1234:5678:90ab:cdef:9999:9999". Therefore, the setting value comparison unit 423 determines that a difference is generated in the setting values of the IP address before and after the import data is reflected. If a difference in the network setting is generated by the import processing, the holding unit 424 holds the IP address of the import data "2001:0 db8:1234:5678:90ab:cdef:9999:9999" in a predetermined storage area. After that, during the import processing performed by the image processing apparatus 102, the sending/receiving unit 421 retrieves the held IP address in response to the polling performed by the distribution apparatus 101 to confirm the import status, and notifies the distribution apparatus 101 about the retrieved IP address.

FIG. 6C is a diagram illustrating the import processing including the setting values of both an IP address of IPv4 and an IP address of IPv6.

In an example in a row 621, for the IP address of IPv4, the present setting value of the image processing apparatus 102 and the setting value of the import data are both "192.168.0.1". In addition, for the IP address of IPv6, the present setting value of the image processing apparatus 102 and the setting value of the import data are both "2001:0 db8:1234:5678:90ab:cdef:0000:0000". Therefore, the setting value comparison unit 423 determines that the setting values of the IP addresses of IPv4 and IPv6 before and after the import data is reflected are equal. If the setting value of the IP address is not changed by the import processing, the image processing apparatus 102 reflects the distributed import data without notifying the distribution apparatus 101.

In an example in a row 622, for the IP address of IPv4, the present setting value of the image processing apparatus 102 and the setting value of the import data are both "192.168.0.1". However, for the IP address of IPv6, the present IP address of the image processing apparatus 102 is "2001:0 db8:1234:5678:90ab:cdef:0000:0000" and the IP address of the import data is "2001:0 db8:1234:5678:90ab: cdef:9999:9999". Therefore, the setting value comparison unit 423 determines that a difference is generated in the setting values of the network setting before and after the import data is reflected. The holding unit 424 holds "2001:0 db8:1234:5678:90ab:cdef:9999:9999", which is the IP address of IPv6 of the import data and determined different from the present IP address, in a predetermined storage area. After that, the image processing apparatus 102 confirms the IP header of the packet used for the polling performed by the distribution apparatus 101 to confirm the import status. If the protocol used by the distribution apparatus 101 for the polling is IPv6, the sending/receiving unit 421 retrieves the held IP address in response to the polling performed by the distribution apparatus 101 and notifies the distribution apparatus 101 about the retrieved IP address. On the other hand, if the protocol used by the distribution apparatus 101 for the polling is IPv4, the image processing apparatus 102 reflects the distributed import data without notifying the distribution apparatus 101 about the retrieved IP address.

In an example in a row 623, for the IP address of IPv4, the present IP address of the image processing apparatus 102 is "192.168.0.1" and the IP address of the import data is "192.168.0.2". On other hand, for the IP address of IPv6, the present setting value of the image processing apparatus 102 and the setting value of the import data are both "2001:0 db8:1234:5678:90ab:cdef:0000:0000". Therefore, the setting value comparison unit 423 determines that a difference is generated in the setting values of the network setting before and after the import data is reflected. The holding unit 424 holds "192.168.0.2", which is the IP address of IPv4 of the import data and determined different from the present IP address, in a predetermined storage area. After that, the image processing apparatus 102 confirms the IP header of the packet used for the polling performed by the distribution apparatus 101 to confirm the import status. If the protocol used by the distribution apparatus 101 for the polling is IPv4, the sending/receiving unit 421 retrieves the IP address, which is held, in response to the polling from the distribution apparatus 101 and notifies the distribution apparatus 101 about the retrieved IP address. On the other hand, if the protocol used by the distribution apparatus 101 for the polling is IPv6, the image processing apparatus 102 reflects the distributed import data without notifying the distribution apparatus 101 about the retrieved IP address.

In an example in a row 624, for the IP address of IPv4, the present IP address of the image processing apparatus 102 is "192.168.0.1" and the IP address of the import data is "192.168.0.2". For the IP address of IPv6, the present IP address of the image processing apparatus 102 is "2001:0 db8:1234:5678:90ab:cdef:0000:0000" and the IP address of the import data is "2001:0 db8:1234:5678:90ab:cdef:9999: 9999". Therefore, the setting value comparison unit 423 determines that a difference is generated in the setting values of the network setting (in this case, in the IP address for both IPv4 and IPv6) before and after the import data is reflected. The holding unit 424 holds the IP addresses of IPv4 and IPv6 of the import data and determined different from the present IP address, in a predetermined storage area. After that, the image processing apparatus 102 confirms the IP header of the packet used for the polling performed by the distribution apparatus 101 to confirm the import status. The image processing apparatus 102 identifies the protocol used by the distribution apparatus 101 for the polling and, in response to the polling, the sending/receiving unit 421 retrieves the IP address, corresponding to the identified protocol, from the predetermined storage area and notifies the distribution apparatus 101 about the retrieved IP address.

<Import Operation of Received Import Data Performed by Image Processing Apparatus>

Figure 7B:
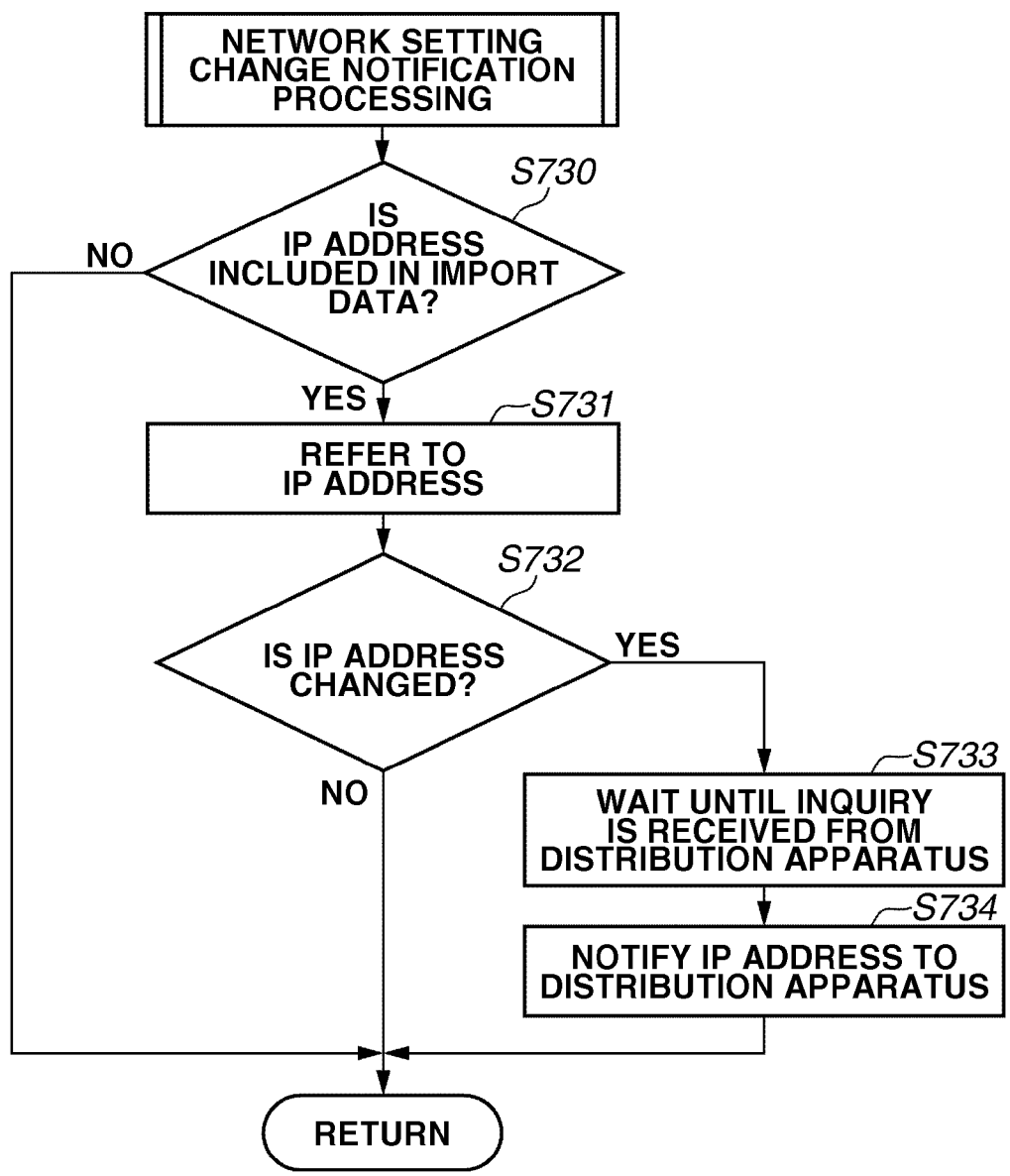

Next, referring to the flowcharts illustrated in FIGS. 7A and 7B, the processing in which the image processing apparatus 102 imports a setting value, is described in detail. This processing is implemented when the CPU executes the control program stored in a predetermined storage area of the image processing apparatus 102 for performing the operation mainly using the modules illustrated in FIG. 4.

FIG. 7A is a flowchart illustrating the import processing in which the image processing apparatus 102 receives import data distributed by the distribution apparatus 101 and performs processing for importing the import data.

In step S701, the sending/receiving unit 421 receives import data from the distribution apparatus 101. In step S702, the sending/receiving unit 421 expands the received import data in a temporary area (for example, RAM 303). Next, in step S703, the import source determination unit 426 determines whether the received import data is received via a network. If the import source determination unit 426 determines that the import data is received via the network (YES in step S703), the processing proceeds to step S705. On the other hand, if the import source determination unit 426 determines that the import data is received not via the network (NO in step S703), the processing proceeds to step S704. In step S704, the reflection unit 425 reflects the setting value of the import data expanded in the temporary area, on the image processing apparatus 102 as in the usual import processing and, after that, the present processing is terminated.

Next, in step S705, the setting value analysis unit 422 analyzes the import data, which is expanded in the temporary area in step S702, and determines whether the import data includes a network setting. If a network setting is included (YES in step S705), the processing proceeds to step S706. If a network setting is not included (NO in step S705), the processing proceeds to step S707. In step S706, the image processing apparatus 102 detects a network setting change during the import processing and, as necessary, performs the notification processing for notifying the distribution apparatus 101 about the network setting change. This notification processing is described below in detail with reference to FIG. 7B. In step S707, the reflection unit 425 reflects the setting value of the import data expanded in the temporary area, on the image processing apparatus 102.

Next, in step S708, the reflection unit 425 determines whether restart (reboot) is required in order to use the setting implemented by the import processing by the image processing apparatus 102. Whether restart is required depends on a reflected setting value and a type of the image processing apparatus. The image processing apparatus, for which restart is required, can perform an operation, corresponding to the setting value reflected by the reflection unit 425 in step S707, after the device is restarted. If restart is not required (NO in step S708), the processing proceeds to step S713. If restart is required (YES in step S708), the processing proceeds to step S709.

In step S709, the sending/receiving unit 421 waits for a polling inquiry to be sent from the distribution apparatus 101 for acquiring the import status. In step S710, in response to the polling inquiry from the distribution apparatus 101 for acquiring the import status, the sending/receiving unit 421 notifies the distribution apparatus 101 that the image processing apparatus 102 must be restarted. Usually, a response to the polling from the distribution apparatus 101 for acquiring the import status is a status notification such as "setting being reflected" or "import error". In step S710, in addition to the status, the sending/receiving unit 421 notifies the distribution apparatus 101 that restart is required.

In step S711, the sending/receiving unit 421 receives a restart request command from the distribution apparatus 101. In step S712, the reflection unit 425 performs restart according to the received restart command. In step S713, the processing is performed to confirm the change in the setting values that is performed during the import. In the present exemplary embodiment, because no setting value is changed during the import processing, this processing is omitted and the processing proceeds directly to step S714.

In step S714, the image processing apparatus 102 waits for a polling inquiry for acquiring the import status to be sent from the distribution apparatus 101. In step S715, in response to a polling inquiry from the distribution apparatus 101 for acquiring the import status, the sending/receiving unit 421 notifies the distribution apparatus 101 about the import result as usual. In this case, the import result is, for example, "import completed" or "import error". After that, the processing is terminated.

<Network Setting Change Notification Processing>

FIG. 7B is a flowchart illustrating the processing performed in step S706 described above.

In step S730, the setting value analysis unit 422 determines whether the import data, which is expanded in the temporary area in step S702, includes a setting value of a network setting used for communication with an external device on the network. Although an IP address is used in the present exemplary embodiment as an example of a setting value used for communication, the present invention is applicable also to other information, such as authentication information or address information used for communication with the image processing apparatus 102. If the setting value analysis unit 422 determines that the import data does not include an IP address (NO in step 730), the processing proceeds to step S707 in FIG. 7A. If an IP address is included in the import data (YES in step S730), the processing proceeds to step S731.

In step S731, the setting value comparison unit 423 refers to the IP address of the import data expanded in the temporary area, and the IP address that is set in the image processing apparatus 102. In step S732, the setting value comparison unit 423 determines whether the IP address is changed before and after the import data processing based on the comparison between the IP addresses referred to in step S731. If the IP address is not changed (NO in step S732), the processing proceeds to step S707 in FIG. 7A. If the IP address is changed (YES in step S732), the processing proceeds to step S733.

The detailed processing performed by the setting value comparison unit 423 to determine whether the IP address is changed is described above with reference to FIGS. 6A to 6C. More specifically, the setting value comparison unit 423 performs the determination processing by confirming whether at least one of an IP address of IPv4 and an IP address of IPv6 is included in the import data and by confirming whether the IP address associated with the protocol, which will affect the communication with the distribution apparatus 101, is changed. To identify a protocol used for the communication with the distribution apparatus 101, the header information of an inquiry packet, which is sent from the distribution apparatus 101 for the polling to acquire the import status, is used.

Next, in step S733, the sending/receiving unit 421 waits for a polling inquiry for acquiring the import status to be sent from the distribution apparatus 101. In step S734, in response to the polling inquiry from the distribution apparatus 101 for acquiring the import status, the sending/receiving unit 421 notifies the distribution apparatus 101 about the IP address of the import data and determined to be changed. After that, the processing proceeds to step S707 in FIG. 7A.

In a case where it is determined that the IP address is changed, the IP address determined to be changed may also be notified to the distribution apparatus 101 as an event from the image processing apparatus 102 without waiting for the inquiry to be sent from the distribution apparatus 101. However, there is a possibility that the distribution apparatus 101 will fail to receive the information about the event from the image processing apparatus 102. To avoid this issue, in the present exemplary embodiment, an example in which the polling method is used to notify the distribution apparatus 101 about a change in the IP address so that the distribution apparatus 101 can get the information more reliably, is described in detail.

<Setting Value Distribution Operation Performed by Distribution Apparatus>

Figure 8B:
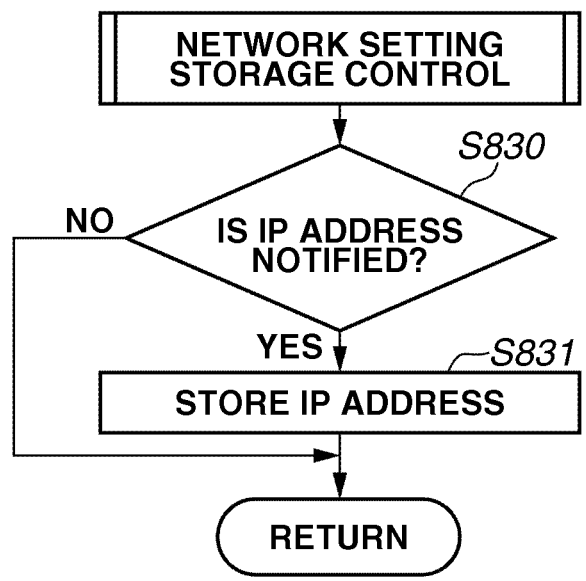
Figure 8C:
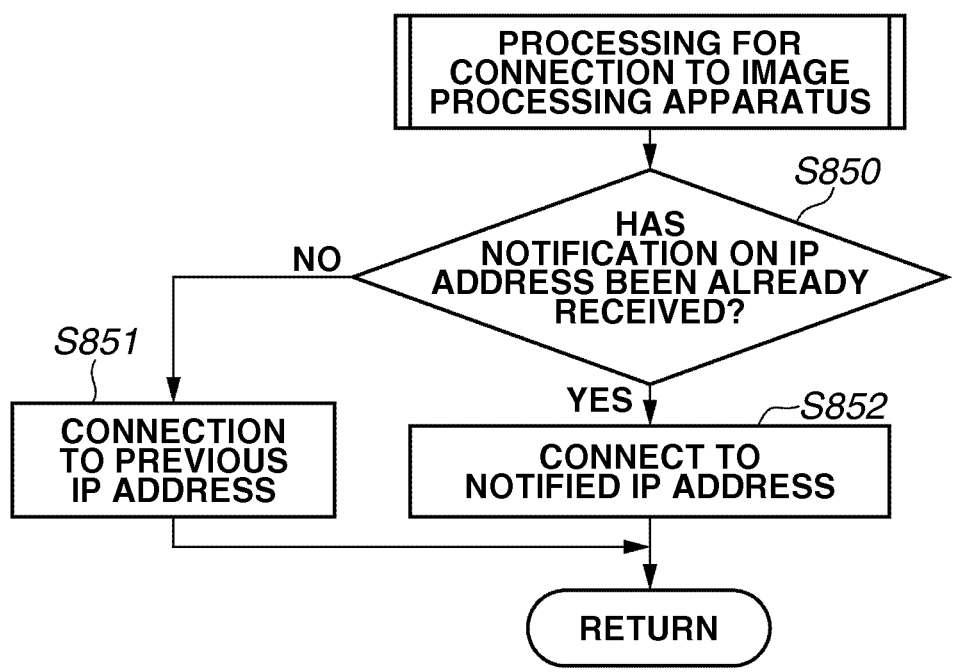

Next, referring to the flowcharts illustrated in FIGS. 8A to 8C, the processing in which the distribution apparatus 101 distributes a setting value to the image processing apparatus 102, is described in detail. This processing is implemented when the CPU executes the control program stored in a predetermined storage area of the distribution apparatus 101 for performing the operation mainly using the modules illustrated in FIG. 4.

FIG. 8A is a flowchart illustrating the processing in which the distribution apparatus 101 distributes import data. This processing is performed by executing an import task according to the content that is set in the task.

First, in step S801, the sending/receiving unit 411 connects to the image processing apparatus 102 to distribute import data to the image processing apparatus 102. After that, in step S802, to acquire the status of the import processing based on the distributed import data, the sending/receiving unit 411 regularly performs the polling processing for the image processing apparatus 102. More specifically, each time the processing proceeds to this step, an import processing status inquiry is issued to the image processing apparatus 102, to which the import data is distributed, if a predetermined period has elapsed from the previous inquiry. This inquiry allows the distribution apparatus 101 to get status information such as "import in progress" or "import completed".

Next, in step S803, the device monitoring unit 412 determines whether a notification about an IP address has been already received from the image processing apparatus 102. If a notification about an IP address has been already received from the image processing apparatus 102 (YES in step S803), the processing proceeds to step S804. On the other hand, if a notification about an IP address has not yet been received (NO in step S803), the processing proceeds to step S806. In step S804, the connection destination determination unit 414 determines whether the sending/receiving unit 411 can connect to the image processing apparatus 102 using the IP address used for the present connection to the image processing apparatus 102. If the sending/receiving unit 411 can connect (YES in step S804), the processing proceeds to step S806. If not (NO in step S804), the processing proceeds to step S805. In step S805, the device monitoring unit 412 changes the setting so that the sending/receiving unit 411 can connect to the image processing apparatus 102 using the IP address notified from the image processing apparatus 102.

Thereafter, the sending/receiving unit 411 connects to the image processing apparatus 102 using the changed IP address. In step S806, the device monitoring unit 412 determines whether an import processing status notification is received from the image processing apparatus 102 as a response to the inquiry issued in S802. If an import processing status notification is received (YES in step S806), the processing proceeds to step S807. If other information is notified (NO in step S806), the processing proceeds to step S808. In step S807, the device monitoring unit 412 determines whether the notified import processing status is an import result such as "import completed" or "import error". If it is determined that the import processing status is a status indicating an import result (YES in step S807), the processing is terminated. If a status such as "import in progress" is notified (NO in step S807), the processing returns to step S802 to continue the polling processing.

In step S808, the distribution apparatus 101 performs the storage control processing for the network setting notified from the image processing apparatus 102. This storage control processing is described in detail below with reference to FIG. 8B.

Next, in step S809, the device monitoring unit 412 determines whether a notification, which indicates that restart is required, is received from the image processing apparatus 102 as a response to the inquiry issued in step S802. If the notification indicating that restart is required is received (YES in step S809), the processing proceeds to step S810. If the notification is not received (NO in step S809), the operation returns to step S802 to continue the polling processing.

In step S810, the sending/receiving unit 411 sends a restart command to the image processing apparatus 102. In step S811, the distribution apparatus 101 connects to the image processing apparatus 102. This connection processing is described in detail below with reference to FIG. 8C. When the connection processing in step S811 is completed, the processing returns to step S802 to continue the polling processing.

<Network Setting Storage Control>

FIG. 8B is a flowchart illustrating the processing in step S808 described above.

In step S830, the device monitoring unit 412 determines whether an IP address is notified from the image processing apparatus 102 as a response to the inquiry issued in step S802. The notification about an IP address is the notification based on the processing in step S734 in FIG. 7B described above. If the notification about an IP address is received from the image processing apparatus 102 (YES in step S830), the processing proceeds to step S831. If the notification is not received (NO in step S830), the processing proceeds to step S809 in FIG. 8A. In step S831, the holding unit 413 stores the IP address, which is notified from the image processing apparatus 102, in a predetermined storage area and, after that, the processing proceeds to step S809 in FIG. 8A. The IP address stored in this step is used in the processing in step S805 in FIG. 8A or in the processing in step S852 in FIG. 8C described below.

<Processing for Connection to Image Processing Apparatus>

FIG. 8C is a flowchart illustrating the connection processing, described above in step S811, performed by the distribution apparatus 101 after the image processing apparatus 102 is restarted.

In step S850, the device monitoring unit 412 determines whether a notification about an IP address has been already received from the image processing apparatus 102. If the notification about an IP address has been already received from the image processing apparatus 102 (YES in step S850), the processing proceeds to step S852. On the other hand, if the notification has not yet been received (NO in step S850), the processing proceeds to step S851. In step S851, the device monitoring unit 412 sets up the address so that the connection to the image processing apparatus 102 is established using the previous IP address that has been used for the connection from the distribution apparatus 101 to the image processing apparatus 102.

In step S852, the device monitoring unit 412 changes the setting so that the connection to the image processing apparatus 102 is established using the IP address notified from the image processing apparatus 102. Thereafter, the sending/receiving unit 411 connects to the image processing apparatus 102 using the IP address that has been changed. After the processing in steps S851 and S852, the processing returns to step S802 and the distribution apparatus 101 continues the polling processing. If the image processing apparatus 102 must be restarted to reflect the setting value of the import data, the distribution apparatus 101 can issue an inquiry in step S802 again after the processing in step S852 and, as a response to the inquiry, receive an import result from the image processing apparatus 102.

As described above, before a network setting change is reflected on the image processing apparatus 102, the notification about the change can be notified to the distribution apparatus 101 to which the image processing apparatus 102 is connected. The distribution apparatus 101 can get information about the import status by using the notified IP address while maintaining the communication connection to the image processing apparatus 102.

In the present exemplary embodiment, when a notification about an IP address change is received from the image processing apparatus 102, the IP address used at that time is not changed. More specifically, the IP address used for the connection is changed after confirming that the connection cannot be established in step S805 or after sending the restart command in step S811. This is because, if the IP address is changed without confirming the connection before the restart command is sent, the restart command cannot be sent to the image processing apparatus 102 that must be restarted to reflect the setting.

In the exemplary embodiment described above, an IP address change is detected based on a notification from the image processing apparatus 102.

If the setting of Dynamic Host Configuration Protocol (DHCP) of the image processing apparatus 102 becomes valid after the import processing, an issue occurs in which an IP address that can maintain connection cannot be detected from the import data.

Therefore, in the present exemplary embodiment, the processing for maintaining connection between the distribution apparatus 101 and the image processing apparatus 102 even when the Dynamic Host Configuration Protocol (DHCP) setting becomes valid in the import processing is described.

<Example of DHCP Setting Change Processing>

FIG. 9 is a table illustrating an example the setting values of DHCP settings to be reflected before and after the import processing performed by the image processing apparatus 102.

In an example in a row 901, the present DHCP setting of the image processing apparatus 102 is valid and the DHCP setting of the import data is also valid. Therefore, the same IP address is distributed by DHCP before and after the import processing. In an example in a row 902, the present DHCP setting of the image processing apparatus 102 is invalid and the DHCP setting of the import data is valid. Therefore, the IP address of the image processing apparatus 102 is changed after the import processing. In an example in a row 903, the present DHCP setting of the image processing apparatus 102 is valid and the DHCP setting of the import data is invalid. Therefore, the IP address of the import data is reflected on the image processing apparatus 102 after the import processing.

<Operation of DHCP Setting Change Detection and Notification Processing>

In the present exemplary embodiment, the import processing considering the DHCP setting is described. Basically, the operation of the image processing apparatus 102 performed in the present exemplary embodiment during the import processing is the same as that illustrated in FIG. 7A. The difference from the first exemplary embodiment is the network setting change notification processing in step S706 and the setting value confirmation processing in step S713. The processing different from that in the first exemplary embodiment will be described in detail.

<Network Setting Change Notification Processing>

Figure 10A:
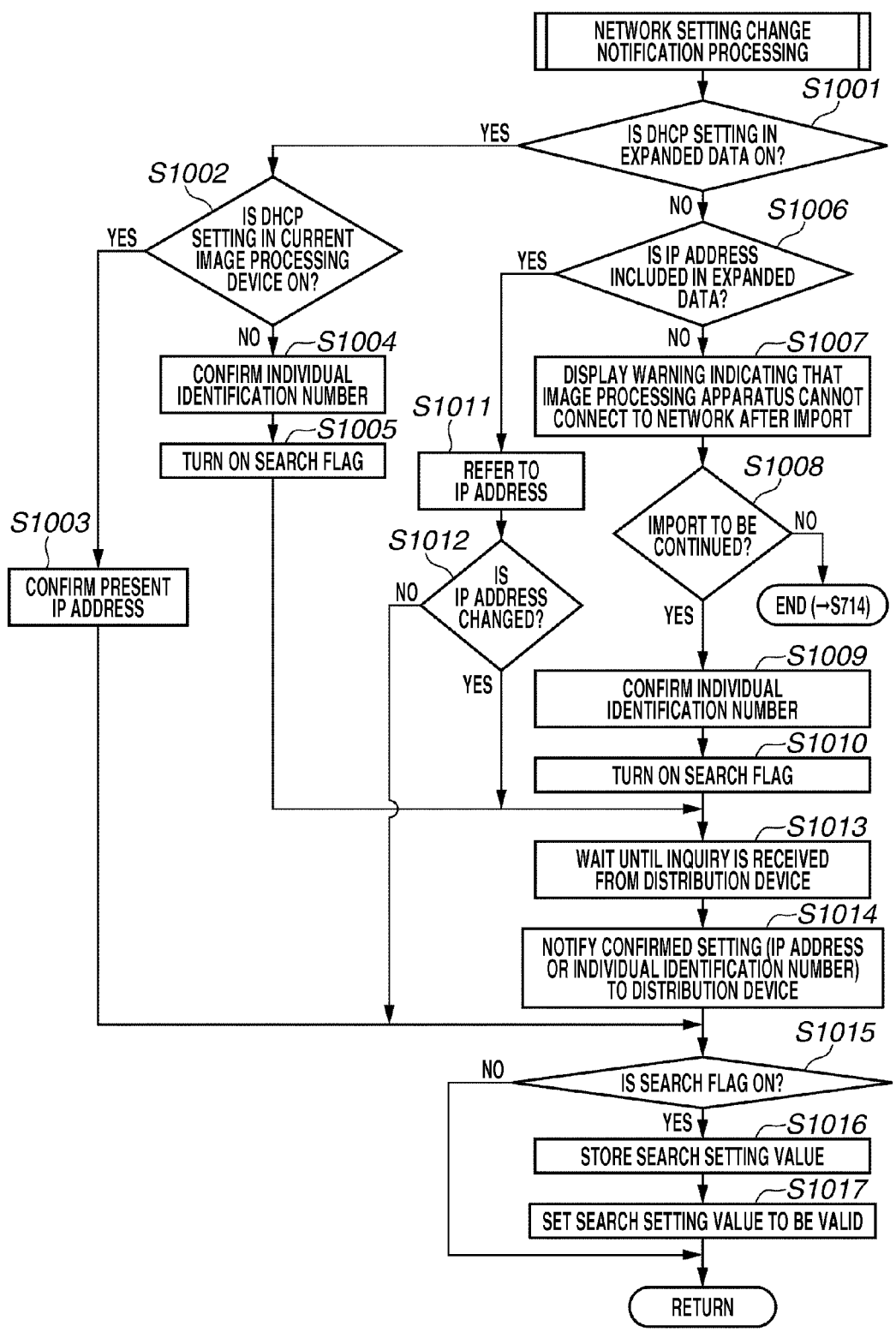
FIGS. 10A and 10B are flowcharts illustrating processing performed by the image processing apparatus considering a setting according to the second exemplary embodiment.

FIG. 10A is a flowchart illustrating the processing in step S706 in FIG. 7A according to the second exemplary embodiment.

In step S1001, the setting value analysis unit 422 refers to the import data, which is expanded in the temporary area, and determines whether the DHCP setting is valid (On). If the DHCP setting is valid (YES in step S1001), the processing proceeds to step S1002. If the DHCP setting is invalid (NO in step S1001), the processing proceeds to step S1006. In step S1002, the setting value comparison unit 423 determines whether the present DHCP setting of the image processing apparatus 102 is valid (On). If the present DHCP setting of the image processing apparatus 102 is valid (YES in step S1002), the processing proceeds to step S1003. If the present DHCP setting is invalid (NO in step S1002), the processing proceeds to step S1004.

In step S1003, the setting value comparison unit 423 refers to the present IP address of the image processing apparatus 102 and then the processing proceeds to step S1015. If the DHCP setting has been valid, a setting change notification is not sent to the distribution apparatus 101 because the same IP address is assigned even when the image processing apparatus 102 is restarted.

On the other hand, in step S1004, the setting value comparison unit 423 confirms the identification information on the image processing apparatus 102. The identification information, confirmed in this step, is an individual identification number that is information unique to the image processing apparatus 102. In step S1005, the setting value comparison unit 423 causes the search flag to be valid. The search flag refers to a flag that indicates whether the setting change is required so that the distribution apparatus 101 can find the image processing apparatus 102 by performing the search that is described below.

In step S1006, the setting value analysis unit 422 determines whether the import data, which has been expanded in the temporary area in step S702, includes an IP address. If an IP address is not included (NO in step S1006), the processing proceeds to step S1007. If an IP address is included (YES in step S1006), the processing proceeds to step S1011.

In step S1007, the setting value analysis unit 422 displays a warning, via the operation unit I/F 305, indicating that a network connection cannot be established after the import. On this displayed warning screen, the setting value analysis unit 422 prompts the user of the image processing apparatus 102 to respond whether to continue or cancel the import processing. If the import processing is canceled, the import processing status becomes an "import error". In step S1008, the setting value analysis unit 422 determines whether the user of the image processing apparatus 102 selects to continue the import processing. If the user selects to cancel the import processing (NO in step S1008), the import processing is forced to cancel and then the processing proceeds to step S714 in FIG. 7A. On the other hand, if the user selects to continue the import processing (YES in step S1008), the processing proceeds to step S1009. In step S1009, the setting value comparison unit 423 confirms the individual identification number of the image processing apparatus 102. In step S1010, the setting value comparison unit 423 causes the search flag to be valid.

In step S1011, the setting value comparison unit 423 refers to the IP address of the import data expanded in the temporary area, and the IP address that is set in the image processing apparatus 102. In step S1012, the setting value comparison unit 423 compares the IP addresses referred to in step S731 to determine whether the IP address is changed before and after the import data processing. If the IP address is not changed (NO in step S1012), the processing proceeds to step S1015. If the IP address is changed (YES in step S1012), the processing proceeds to step S1013.

In step S1013, the sending/receiving unit 421 waits for a polling inquiry for acquiring the import status from the distribution apparatus 101. In step S1014, in response to the polling inquiry issued by the distribution apparatus 101 for acquiring the import status, the sending/receiving unit 421 notifies the distribution apparatus 101 about the individual identification number confirmed in step S1004, the individual identification number confirmed in step S1009, or the IP address whose change is confirmed in step S1012.

In step S1015, the setting value analysis unit 422 confirms whether the search flag is valid. If the search flag is invalid (NO in step S1015), the processing proceeds to step S707 in FIG. 7A. If the search flag is valid (YES in step S1015), the processing proceeds to step S1016. In step S1016, the holding unit 424 stores the present setting values of the setting items (Simple Network Management Protocol (SNMP) and so on) that must be changed to allow the distribution apparatus 101 to search for the image processing apparatus 102. In step S1017, the reflection unit 425 changes the setting of SNMP and so on so that the distribution apparatus 101 can search for the image processing apparatus 102. After that, the processing proceeds to step S707 in FIG. 7A.

<Operation for Setting Search Setting Value to Previous Value>

Figure 10B:
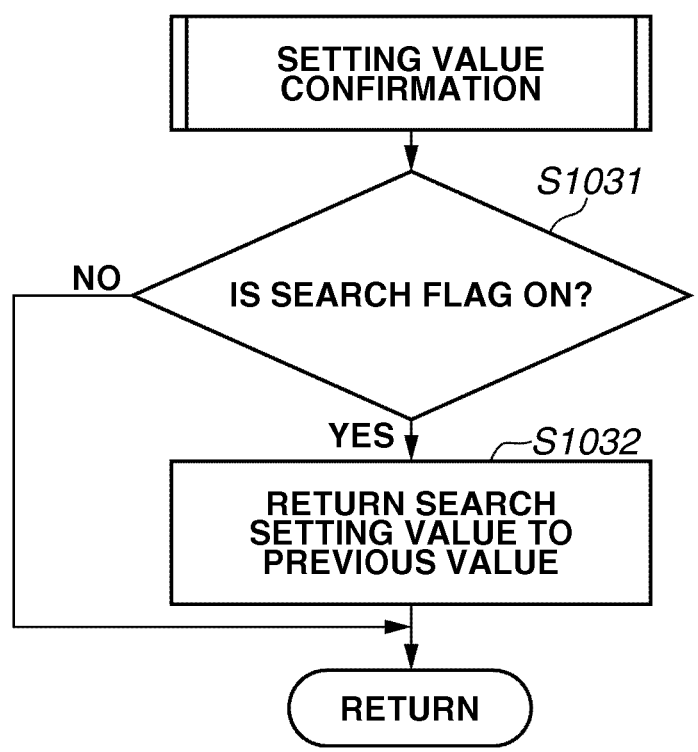

FIG. 10B is a flowchart illustrating the processing in step S713 in FIG. 7A according to the second exemplary embodiment.

In step S1031, the setting value analysis unit 422 confirms whether the search flag is valid. If the search flag is invalid (NO in step S1031), the processing proceeds directly to step S714 in FIG. 7A. If the search flag is valid (YES in step S1031), in step S1032, the reflection unit 425 returns the setting to the setting, which is stored in the processing in step S1016 in FIG. 10A. After that, the processing proceeds to step S714 in FIG. 7A.

<Operation for Distribution Apparatus to Distribute Setting Values>

In the present exemplary embodiment, the operation in which the distribution apparatus 101 distributes setting values to the image processing apparatus 102 and confirms the import status, is basically the same as that illustrated in FIG. 8A. The difference from the first exemplary embodiment is the processing in steps S808 and S811. The processing different from that according to the first exemplary embodiment, will be described in detail.

<Network Setting Storage Control>

Figure 11A:
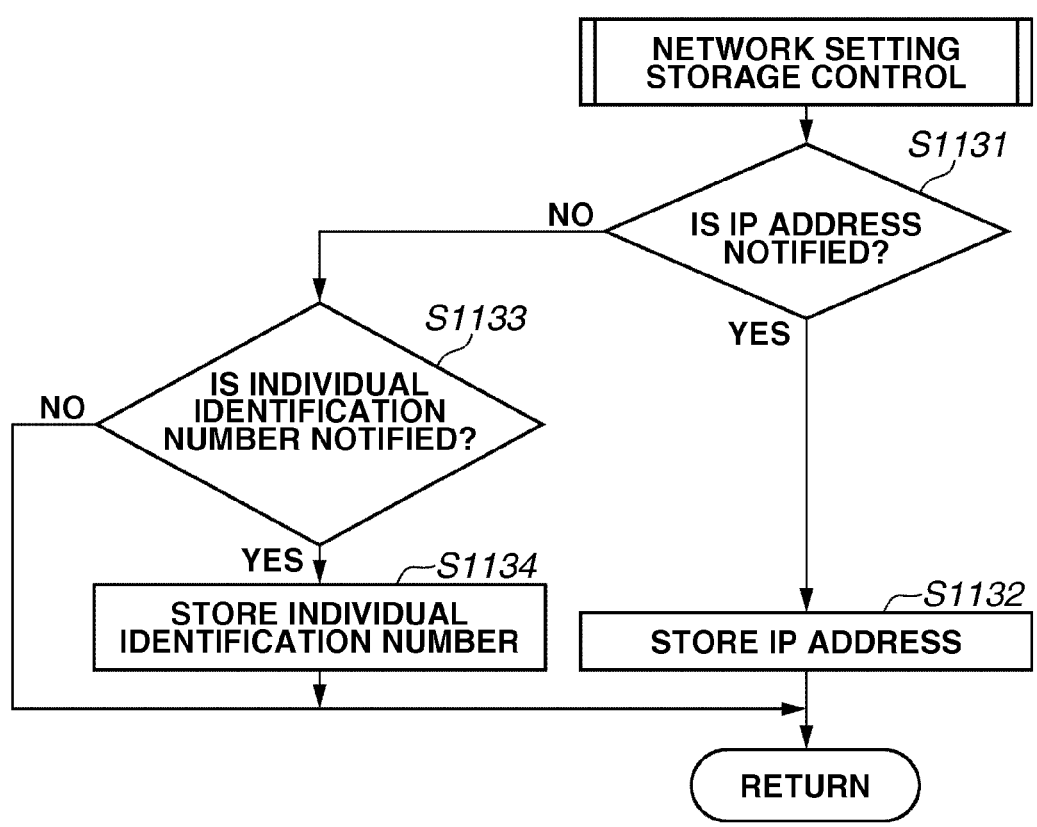

FIG. 11A is a flowchart illustrating the processing in S808 in FIG. 8A according to the second exemplary embodiment.

In step S1131, the device monitoring unit 412 determines whether an IP address is notified from the image processing apparatus 102 as a response to the inquiry issued in step S802. The notification of the IP address in this step is the notification based on the processing in step S1014 in FIG. 10A described above. If the IP address notification is received from the image processing apparatus 102 (YES in step S1131), the processing proceeds to step S1132. If the notification is not received (NO in step S1131), the processing proceeds to step S1133. In step S1132, the holding unit 413 stores the IP address, which is notified from the image processing apparatus 102, in a predetermined storage area and, after that, the processing proceeds to step S809 in FIG. 8A. The IP address stored in this step is used in the processing in step S805 in FIG. 8A described above or in step S1106 in FIG. 11B described below.

In step S1133, the device monitoring unit 412 determines whether an individual identification number is notified from the image processing apparatus 102 as a response to the inquiry issued in step S802. The notification of the individual identification number in this step is the notification based on the processing in step S1014 in FIG. 10A described above. If the individual identification number is notified from the image processing apparatus 102 (YES in step S1133), the processing proceeds to step S1134. If the individual identification number is not notified (NO in step S1133), the processing proceeds to step S809 in FIG. 8A. In step S1134, the holding unit 413 stores the individual identification number, which is notified from the image processing apparatus 102, in a predetermined storage area and, after that, the processing proceeds to step S809 in FIG. 8A.

<Processing for Connection to Image Processing Apparatus>

FIG. 11B is a flowchart illustrating the processing in S811 in FIG. 8A according to the second exemplary embodiment.

In step S1101, the device monitoring unit 412 determines whether the notification about an IP address or an individual identification number is received from the image processing apparatus 102. If the IP address or the individual identification number is received (YES in step S1101), the processing proceeds to step S1103. If neither the IP address nor the individual identification number is received (NO in step S1101), the processing proceeds to step S1102. In step S1102, the device monitoring unit 412 sets up the address so that the connection to the image processing apparatus 102 is established using the previous IP address that has been used for the connection from the distribution apparatus 101 to the image processing apparatus 102.

In step S1103, the device monitoring unit 412 sets up the connection so that the connection to the image processing apparatus 102 is established using the original IP address as in step S1102. The sending/receiving unit 411 connects to the image processing apparatus 102 using the previous IP address. In step S1104, the connection destination determination unit 414 determines whether the connection to the image processing apparatus 102 will be unsuccessful. If the connection will be successful (NO in step S1104), the operation returns to step S1103. If the connection will be unsuccessful (YES in step S1104), the processing proceeds to step S1105.

In step S1105, the device monitoring unit 412 determines whether a notification about an IP address has been already received from the image processing apparatus 102. If the notification about the IP address has been already received from the image processing apparatus 102 (YES in step S1105), the processing proceeds to step S1106. On the other hand, if the notification has not been yet received (NO in step S1105), the processing proceeds to step S1107. In step S1106, the device monitoring unit 412 changes the setting so that the connection to the image processing apparatus 102 is established using the IP address notified from the image processing apparatus 102. From this time, the sending/receiving unit 411 uses the changed IP address to connect to the image processing apparatus 102.

In step S1107, the device monitoring unit 412 performs a broadcast for the network and analyzes the responses received from the image processing apparatuses. The device monitoring unit 412 checks the image processing apparatuses that respond to the broadcast to find an image processing apparatus that has the individual identification number held in the holding unit 413 and, thus, identifies the image processing apparatus 102. The device monitoring unit 412 acquires the IP address of the image processing apparatus 102 from the response of the identified image processing apparatus 102. Next, in step S1108, the device monitoring unit 412 changes the setting so that the connection to the image processing apparatus 102 is established using the IP address acquired in step S1107. From this time, the sending/receiving unit 411 connects to the image processing apparatus 102 using the changed IP address.

As described above, even when the DHCP setting becomes valid during the import processing, the connection between the distribution apparatus 101 and the image processing apparatus 102 can be maintained and the distribution apparatus 101 can get the information about the import status according to the present exemplary embodiment.

In the second exemplary embodiment described above, when the DHCP setting becomes valid during the import processing, the distribution apparatus 101 performs a broadcast on the network to identify the IP address of an image processing apparatus. However, when the distribution apparatus 101 is connected to an image processing apparatus across a router, the solution according to the second exemplary embodiment may fail. Even in an environment where a broadcast can be used, the broadcast will increase the network traffic.

To avoid this, in a third exemplary embodiment, the processing is described below in which, when the DHCP becomes valid during the import processing, the image processing apparatus 102 acquires an IP address in a manner different from that in the present exemplary embodiment.

In present exemplary embodiment, the processing is similar to that in the first exemplary embodiment except the processing illustrated in FIG. 7B. The processing different from that of the first exemplary embodiment will be described in detail.

<Notification Processing about Network Setting Change>

Figure 12:
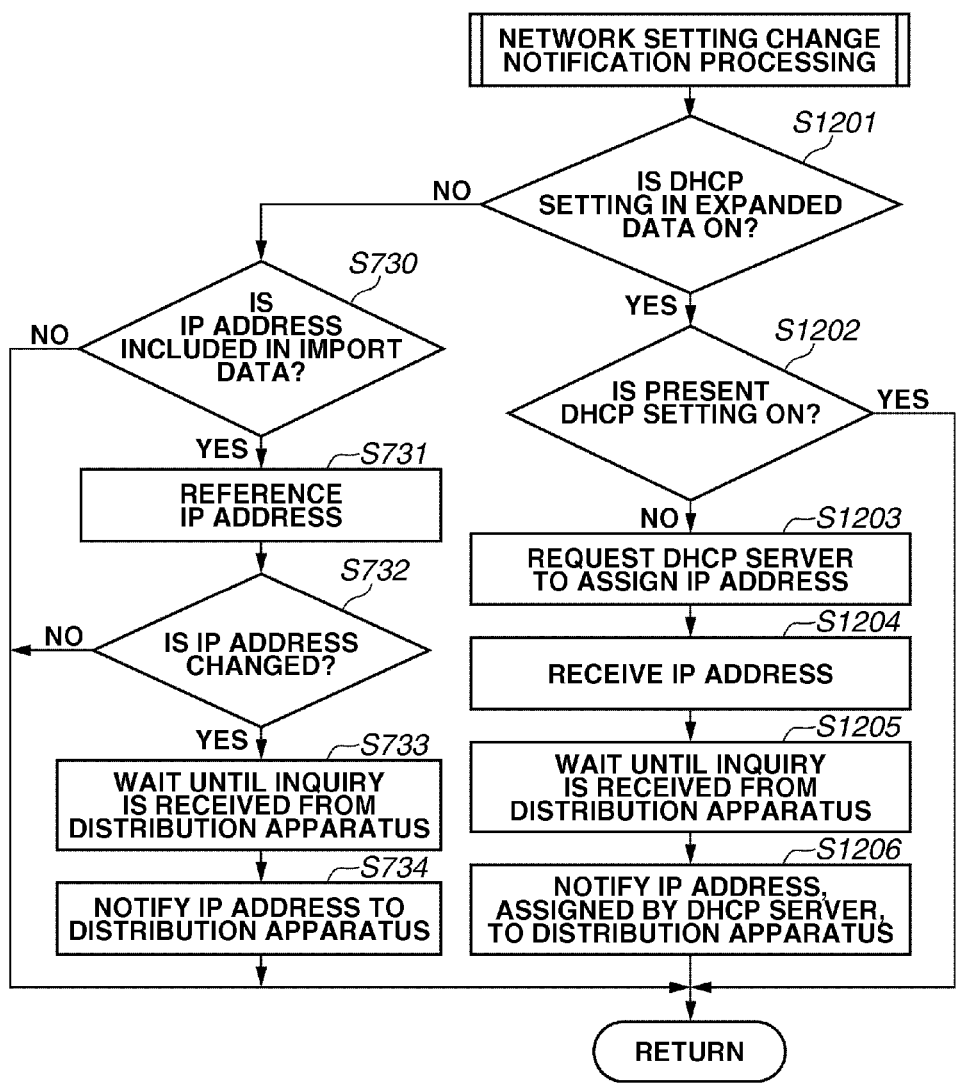
FIG. 12 is a flowchart illustrating processing performed by an image processing apparatus considering a DHCP setting according to a third exemplary embodiment.

FIG. 12 is a flowchart illustrating the processing according to the present invention corresponding to step S706 in FIG. 7A. The processing from steps S730 to S734 is the same processing described in FIG. 7B with the same reference numerals and, therefore, the description thereof is omitted.

In step S1201, the setting value analysis unit 422 refers to the import data expanded in the temporary area and determines whether the DHCP setting is valid (On). If the DHCP setting is valid (YES in step S1201), the processing proceeds to step S1202. If the DHCP setting is invalid (NO in step S1201), the processing proceeds to step S730. In step S1202, the setting value comparison unit 423 determines whether the present DHCP setting of the image processing apparatus 102 is valid (On). If the present DHCP setting of the image processing apparatus 102 is invalid (NO in step S1202), the processing proceeds to step S1203. If the present DHCP setting is valid (YES in step S1202), the processing proceeds to step S707 in FIG. 7A.

In step S1203, the sending/receiving unit 421 requests the DHCP server to assign an IP address. In step S1204, the sending/receiving unit 421 receives an IP address from the DHCP server.

The request of IP address assignment to the DHCP server, will be described in detail. First, the sending/receiving unit 421 sends the DISCOVER command to the DHCP server. In a case where an IP address OFFER response is received from one or more DHCP servers, the sending/receiving unit 421 determines the server from which to receive an IP address and sends the address of the selected DHCP server using REQUEST. The sending/receiving unit 421 receives a PACK response from the selected DHCP server and confirms the IP address to be assigned. At this time, the IP address assigned by the DHCP server is not reflected.

Next, in step S1205, the sending/receiving unit 421 waits for a polling inquiry for acquiring the import status to be sent from the distribution apparatus 101. In step S1206, the sending/receiving unit 421 responds to the polling inquiry issued by the distribution apparatus 101 for acquiring the import status and notifies the distribution apparatus 101 about the IP address assigned by the DHCP server. After that, the processing proceeds to step S707 in FIG. 7A.

As described above, even if the DHCP setting becomes valid during the import processing or even if the distribution apparatus 101 and the image processing apparatus 102 are connected across a router, the connection can be maintained and, therefore, the distribution apparatus 101 can get information about the import status in this exemplary embodiment.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-122908 filed May 30, 2012, which is hereby incorporated by reference herein in its entirety.

What is claimed is:

1. A distribution system comprising:
a distribution apparatus and an image processing apparatus configured to be connected to the distribution apparatus over a network by using a first setting value,
wherein the image processing apparatus includes:
a first reception unit configured to receive import data from the distribution apparatus,
an analysis unit configured to analyze, from the received import data, a second setting value used to connect to the distribution apparatus over the network, wherein the second setting value is a value different from the first setting value,
a second reception unit configured to receive, from the distribution apparatus, an inquiry to acquire a status of import processing using the received import data,
a first notification unit configured to notify, as a response to the received inquiry, the distribution apparatus about the second setting value analyzed by the analysis unit,
a reflection unit configured to perform the import processing by using the received import data and to reflect the analyzed second setting value after the notification by the first notification unit, and
a second notification unit configured to notify, as a response to the received inquiry using the second setting value, the distribution apparatus about the status of the import processing; and
wherein the distribution apparatus includes:
an inquiry unit configured to send, by using the first setting value, an inquiry to acquire a status of import processing using the import data, after the import data is distributed to the image processing apparatus,
a third reception unit configured to receive, from the first notification unit, the second setting value analyzed by the analysis unit,
a control unit configured to control, in response to the distribution apparatus not being able to connect to the image processing apparatus by using the first setting value, the inquiry unit to issue the inquiry using the second setting value received by the third reception unit, and
a fourth reception unit configured to receive, from the second notification unit, the status of the import processing.

2. An image processing apparatus comprising:
a first reception unit configured to receive import data from a distribution apparatus which can perform communication over a network by using a first setting value;
an analysis unit configured to analyze, from the received import data, a second setting value used to connect to the distribution apparatus over the network, wherein the second setting value is a value different from the first setting value;
a second reception unit configured to receive, from the distribution apparatus, an inquiry to acquire a status of import processing using the received import data;
a reflection unit configured to perform the import processing by using the received import data and reflect the analyzed second setting value;
a first notification unit configured to notify, as a response to the received inquiry, the distribution apparatus about the second setting value analyzed by the analysis unit; and
a second notification unit configured to notify, as a response to the received inquiry, the distribution apparatus about the status of the import processing,
wherein, as a response to the received inquiry, the first notification unit notifies the distribution apparatus about the analyzed second setting value before the reflection unit reflects the analyzed second setting value.

3. The image processing apparatus according to claim 2, wherein the inquiry to acquire the status of the import processing is regularly performed until the import processing is completed.

4. The image processing apparatus according to claim 2, further comprising:
a first determination unit configured to determine, in response to the reflection unit reflecting the analyzed second setting value, whether a restart is required for the image processing apparatus; and
a restart unit configured to restart the image processing apparatus,
wherein, as a response to the received inquiry, the first notification unit sends to the distribution apparatus a notification indicating that a restart is required for the image processing apparatus, and
wherein, in response to a restart command being received from the distribution apparatus, the restart unit restarts the image processing apparatus.

5. The image processing apparatus according to claim 2, wherein the analysis unit analyzes an Internet Protocol (IP) address used to connect with the distribution apparatus over the network, from the received import data.

6. The image processing apparatus according to claim 5, wherein the analysis unit analyzes an IP address of Internet Protocol version 4 (IPv4) or Internet Protocol version 6 (IPv6) used to connect with the distribution apparatus over the network, from the received import data.

7. The image processing apparatus according to claim 5, further comprising a second determination unit configured to determine, using the received import data, whether a Dynamic Host Configuration Protocol (DHCP) setting of the image processing apparatus becomes valid by the import processing,
wherein, in response to determining that the DHCP setting of the image processing apparatus becomes valid, the first notification unit notifies the distribution apparatus about an individual identification number of the image processing apparatus, as a response to the received inquiry.

8. The image processing apparatus according to claim 5, further comprising a second determination unit configured to determine, using the received import data, whether a Dynamic Host Configuration Protocol (DHCP) setting of the image processing apparatus becomes valid by the import processing,
wherein, in response to determining that the DHCP setting of the image processing apparatus becomes valid, the first notification unit notifies the distribution apparatus about an IP address acquired from a DHCP server to which an assignment request is sent, as a response to the received inquiry.

9. A distribution apparatus comprising:
an inquiry unit configured to send, by using a first setting value used to connect with an image processing apparatus over a network, an inquiry to acquire a status of import processing using import data, after the import data is distributed to the image processing apparatus via the network;
a first reception unit configured to receive, from the image processing apparatus as a response to the inquiry, a second setting value used to connect with the image processing apparatus over the network, wherein the second setting value is a value different from the first setting value;
a control unit configured to control, in response to the distribution apparatus not being able to connect to the image processing apparatus by using the first setting value, the inquiry unit to issue the inquiry using the second setting value received by the first reception unit; and a second reception unit configured to receive, as a response to the inquiry using the second setting value received by the first reception unit, the status of the import processing from the image processing apparatus.

10. The distribution apparatus according to claim 9, wherein the inquiry unit regularly performs the inquiry until a notification indicating a completion of the import processing is received by the first reception unit.

11. The distribution apparatus according to claim 9, further comprising a sending unit configured to send a restart command to the image processing apparatus in response to a notification being received by the first reception unit, wherein the notification indicates that restart is required for the image processing apparatus.

12. The distribution apparatus according to claim 9, wherein the second setting value used to connect to the image processing apparatus over the network is an Internet Protocol (IP) address.

13. A control method of an image processing apparatus, the control method comprising:
receiving import data from a distribution apparatus which can perform communication over a network by using a first setting value;
analyzing, from the received import data, a second setting value used to connect to the distribution apparatus over the network, wherein the second setting value is a value different from the first setting value;
receiving, from the distribution apparatus, an inquiry to acquire a status of import processing using the received import data;
performing the import processing by using the received import data and reflect the analyzed second setting value;
notifying, as a first notifying and as a response to the received inquiry, the distribution apparatus about the analyzed second setting value; and
notifying, as a response to the received inquiry, the distribution apparatus about the status of the import processing,
wherein, as a response to the received inquiry, the first notifying notifies the distribution apparatus about the analyzed second setting value before reflecting the analyzed second setting value.

14. The control method according to claim 13, wherein the inquiry to acquire the status of the import processing is regularly performed until the import processing is completed.

15. The control method according to claim 13, further comprising:
determining, in response to reflecting the analyzed second setting value, whether a restart is required for the image processing apparatus; and
restarting the image processing apparatus,
wherein, as a response to the received inquiry, the first notifying includes sending to the distribution apparatus a notification indicating that a restart is required for the image processing apparatus, and
wherein, in response to a restart command being received from the distribution apparatus, restarting includes restarting the image processing apparatus.

16. A non-transitory computer readable storage medium storing a computer program causing an image processing apparatus to perform the method according to claim 13.

17. A control method of a distribution apparatus, the control method comprising:
sending, by using a first setting value used to connect with an image processing apparatus over a network, an inquiry to acquire a status of import processing using import data, after the import data is distributed to the image processing apparatus via the network;

receiving, from the image processing apparatus as a response to the inquiry, a second setting value used to connect with the image processing apparatus over the network, wherein the second setting value is a value different from the first setting value;

controlling, in response to the distribution apparatus not being able to connect to the image processing apparatus by using the first setting value, the sending to issue the inquiry using the received second setting value; and receiving, as a response to the inquiry using the received second setting value, the status of the import processing from the image processing apparatus.

18. The control method according to claim 17, wherein sending the inquiry includes regularly performing the inquiry until a notification indicating a completion of the import processing is received by the first receiving.

19. The control method according to claim 17, further comprising sending a restart command to the image processing apparatus in response to a notification being received by the first receiving, wherein the notification indicates that restart is required for the image processing apparatus.

20. A non-transitory computer readable storage medium storing a computer program causing a distribution apparatus to perform the method according to claim 17.

* * * * *